(12) United States Patent
Lynn (10) Patent No.: US 10,263,700 B2
(45) Date of Patent: Apr. 16, 2019

(54) PANELS WITH LI-FI CONNECTIVITY

(71) Applicant: David Lynn, Welcome, NC (US)

(72) Inventor: David Lynn, Welcome, NC (US)

( * ) Notice: Subject to any disclaimer, the term of this patent is extended or adjusted under 35 U.S.C. 154(b) by 0 days.

(21) Appl. No.: 15/711,773

(22) Filed: Sep. 21, 2017

(65) Prior Publication Data

US 2019/0089457 A1   Mar. 21, 2019

(51) Int. Cl.
*H04B 10/114* (2013.01)
*H04B 10/27* (2013.01)
*H04B 10/50* (2013.01)

(52) U.S. Cl.
CPC ..... *H04B 10/1143* (2013.01); *H04B 10/1149* (2013.01); *H04B 10/27* (2013.01); *H04B 10/502* (2013.01)

(58) Field of Classification Search
None
See application file for complete search history.

(56) References Cited

U.S. PATENT DOCUMENTS

| | | | | |
|---|---|---|---|---|
| 4,850,044 A * | 7/1989 | Block | ................. | H04B 10/803 398/118 |
| 5,500,523 A * | 3/1996 | Hamanaka | ........... | G02B 3/0006 250/216 |
| 6,055,099 A * | 4/2000 | Webb | ...................... | G02B 6/43 359/435 |
| 6,339,506 B1 * | 1/2002 | Wakelin | ............. | G02B 27/0025 359/626 |
| 6,650,844 B1 * | 11/2003 | Davies | ..................... | G02B 6/43 385/14 |
| 7,039,265 B2 * | 5/2006 | Levy | .................... | H04B 10/801 385/14 |
| 9,368,651 B2 | 6/2016 | Antaya et al. | | |
| 2004/0207926 A1 * | 10/2004 | Buckman | ............. | H04B 10/801 359/642 |
| 2007/0053694 A1 * | 3/2007 | Goutzoulis | ............. | G02B 6/43 398/130 |
| 2007/0122156 A1 * | 5/2007 | Wang | ..................... | H04B 10/25 398/141 |
| 2008/0310850 A1 * | 12/2008 | Pederson | ........... | G07C 9/00158 398/135 |
| 2008/0310852 A1 * | 12/2008 | Tan | ...................... | H04B 10/803 398/136 |

(Continued)

OTHER PUBLICATIONS

Agarwal et al: "Solar Panel Cells as Power Source and Li-Fi Data Nodes Integrated with Solar Concentrator", IJEACS, vol. 2, Issue 5, May 2017, pp. 172-175.*

(Continued)

*Primary Examiner* — Li Liu
(74) *Attorney, Agent, or Firm* — Coats & Bennett, PLLC (57) ABSTRACT

Panels configured to be connected to a Li-Fi communication network. The panels include a first side and an opposing second side. Components of the Li-Fi network are positioned on the second side. The components include one or more nodes for sending and receiving Li-Fi signals, and one or more light pathways for transmitting and receiving the Li-Fi signals. The panels may be further configured to connect to a support structure to allow for Li-Fi communication with the support structure and/or adjacent panel. The support structure is configured to support the panels and also facilitate the Li-Fi communication.

11 Claims, 9 Drawing Sheets

(56) References Cited

U.S. PATENT DOCUMENTS

| | | | | |
|---|---|---|---|---|
| 2009/0140755 | A1* | 6/2009 | Byers | H04B 10/803 324/763.01 |
| 2010/0028018 | A1* | 2/2010 | Tan | G02B 6/43 398/141 |
| 2010/0307075 | A1* | 12/2010 | Zampini | F21S 2/00 52/173.1 |
| 2011/0097084 | A1* | 4/2011 | Kornilovich | G06F 15/16 398/58 |
| 2012/0023726 | A1 | 2/2012 | Bellacicco et al. | |
| 2014/0241711 | A1* | 8/2014 | Saint Georges | H04B 10/27 398/5 |
| 2016/0308614 | A1 | 10/2016 | Tsonev et al. | |

OTHER PUBLICATIONS

RF Wireless World. LiFi vs WiFi-Basic difference between LiFi and WiFi pp. 1-4, Retrieved from the internet on Sep. 21, 2017 at the following URL: http://www.rfwireless-world.com/Terminology/LiFi-vs-WiFi.html.

Science Alert Bec Crew. "Li-Fi Has Just Been Tested in The Real World, And It's 100 Times Faster Than Wi-Fi" pp. 1-5, Retrieved from the internet on Sep. 21, 2017 at the following URL: https://www.sciencealert.com/li-fi-tested-in-the-real-world-for-the-first-time-is-100-times-faster-than-wi-fi.

Mooney, J. "Li-Fi Wireless Technology Is 100 Times Faster Than Wi-Fi" pp. 1-5, Retrieved from the internet on Sep. 21, 2017 at the following URL: https://www.wirelessdesignmag.com/blog/2015/11/li-fi-wireless-technology-100-times-faster-wi-fi.

Schmid, S. et al., "EnLighting: An Indoor Visible Light Communication System Based on Networked Light Bulbs" pp. 1-9.

Greyb Services. Li-Fi Illumination to Communication pp. 1-24.

Author Unknown "Li-Fi" Retrieved from the internet on Sep. 21, 2017 at the following URL: https://en.wikipedia.org/wiki/Li-Fi pp. 1-7.

* cited by examiner

PANELS WITH LI-FI CONNECTIVITY

BACKGROUND

The present application is directed to panels and, more particularly, to panels equipped with communication components that provide for connectivity with a Li-Fi communication network.

Li-Fi is a wireless optical networking technology that uses light-emitting diodes (LEDs) to transmit data. The light emitted by the LEDs is modulated for optical data transmission. The Li-Fi network also includes photoreceptors that receive the transmitted light. The network is configured to for bi-directional communication.

Li-Fi provides for many advantages over other types of communication networks. Li-Fi is particularly effective for security because data cannot be intercepted without a clear line of sight. This provides for many uses for home and building automation because the communications are secure and fast and cannot be hacked from a remote location. Li-Fi is also useful in electromagnetic sensitive areas because it does not cause electromagnetic interference. This is particularly applicable for use in aircraft, hospitals, and nuclear power plants.

As Li-Fi becomes more common place, there exists a need to incorporate a Li-Fi network into these different environments. The Li-Fi components may be built into the network in a manner in which they are protected from the environment. In certain environments, the Li-Fi components may be incorporated in a manner in which they are not clearly visible so as to create aesthetic issues.

SUMMARY

The present application is directed to panels for use with a Li-Fi network. One aspect is directed to a device that includes a panel with a first side and a second side. A first node is connected to the second side of the panel and includes a first transmitter configured to transmit light signals and a first receiver configured to receive the light signals. A second node is spaced away from the first node and is connected to the second side of the panel. The second node includes a second transmitter configured to transmit the light signals and a second receiver configured to receive the light signals. A light path extends along the second side of the panel and between the first and second nodes and includes free space that is enclosed within at least one wall.

The device may include that the at least one wall of the light path is connected to the second side of the panel and the light path is further enclosed by the second side of the panel.

The device may include that the panel includes a polygonal shape and the first node is positioned within a first corner and the second node is positioned within a second corner.

The device may also include an electrical bus connected to the second side of the panel with the electrical bus extending parallel with the light path between the first and second nodes.

The device may include that the panel is transparent and the first and second transmitters are configured to transmit the light signals through the panel.

The device may include that the first node is positioned at a transparent section of the panel and the first transmitter is configured to transmit the light signals through the transparent section.

The device may include a second transmitter at the first node with the first node positioned at a transparent section of the panel with the second transmitter configured to transmit the light signals through the transparent section.

The device may include that the first node is positioned at a transparent section of the panel and the first receiver is configured to receive the light signals through the transparent section.

The device may include a second receiver at the first node and wherein the first node is positioned at a transparent section of the panel with the second receiver configured to receiver the light signals through the transparent section.

Another aspect is directed to a device for use in a Li-Fi Network. The device includes a panel with a first side and a second side and having a polygonal shape. Nodes are positioned on the second side of the panel with one of the nodes positioned in each corner of the panel and with each of the nodes configured to transmit and receive light signals. Light paths are positioned on and extend along the second side of the panel between the nodes with each of the light paths formed within at least one wall.

The device may include that the light paths are enclosed with the at least one wall.

The device may include that the light paths are further formed by the second side of the panel.

The device may include electrical buses that extend along the second side of the panel and along a perimeter edge of the panel between each of the nodes with the electrical buses each including at least one electrical connector that extends outward beyond the perimeter edge. The electrical buses may be parallel to the light paths.

The device may also include that the light paths have free space through which the light signals travel with the free space formed within the at least one wall.

Another aspect is directed to a device for use in a Li-Fi Network. The device includes a panel with a first side and a second side. A first node is positioned at a transparent section of the panel with the first node configured to transmit and receive light signals. A second node is spaced away from the first node and connected to the second side of the panel with the second node configured to transmit and receive the light signals. A light path extends along the second side of the panel and between the first and second nodes with the light path being enclosed within at least one wall for passage of the light signals. The first node is configured to transmit and receive the light signals through the light path with the second node and also configured to transmit and receive the light signals through the transparent section of the panel.

The device may include that the first node has a single transmitter configured to transmit the light signals through both the light path and the transparent section of the panel.

The device may include that the first node has a first transmitter configured to transmit the light signals through the light path and a second transmitter configured to transmit the light signals through the transparent section of the panel.

The device may include that the first node has a single receiver configured to receive the light signals from both the light path and the transparent section of the panel.

The device may include that the first node has a first receiver configured to receive the light signals through the light path and a second receiver configured to receive the light signals through the transparent section of the panel.

The various aspects of the various embodiments may be used alone or in any combination, as is desired.

DETAILED DESCRIPTION

The present application is directed to panels configured to be connected with a Li-Fi communication network. The panels include a first side and an opposing second side. Components of the Li-Fi network are positioned on the second side. The components include one or more nodes for sending and receiving Li-Fi signals, and one or more light pathways for transmitting and receiving the Li-Fi signals. The panels may be further configured to connect to a support structure to allow for Li-Fi communication with the support structure and/or adjacent panel. The support structure is configured to support the panels and also facilitate the Li-Fi communication.

Figure 1:
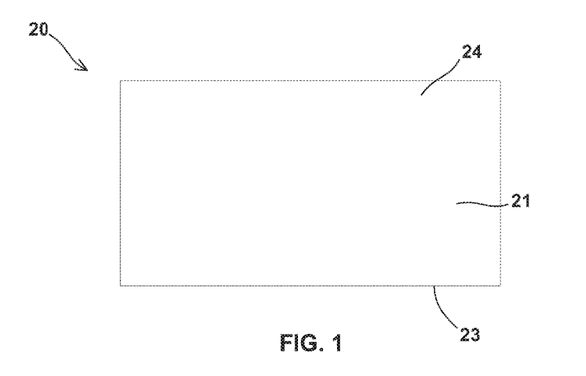
FIG. 1 is a plan view of a first side of a panel.
Figure 2:
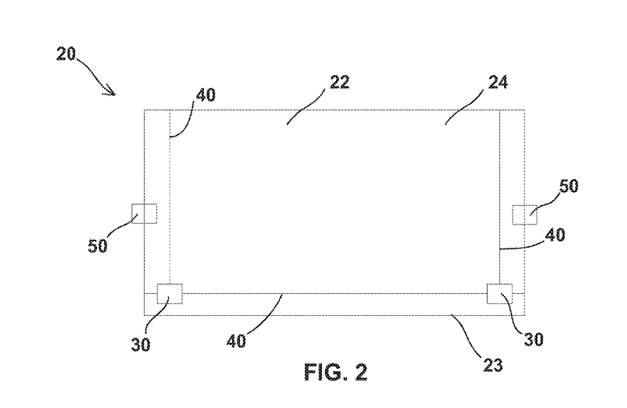
FIG. 2 is a plan view of a second side of panel that includes Li-Fi communication components.

FIGS. 1 and 2 schematically illustrate a panel 20 for use with a Li-Fi network. FIG. 1 illustrates the first side 21 with the components of the Li-Fi network hidden from view and also protected by the panel 20. This provides for the first side 21 to be available for other functionality, such as for photovoltaic cells for a solar panel, or for aesthetic reasons such as a wall or ceiling panel.

FIG. 2 illustrates schematically the components on the second side 22 of the panel 20. The components for the Li-Fi network include one or more nodes 30 and light paths 40 for sending and receiving light signals. The panel 20 may also include one or more connectors 50 for attaching the panel 20 to a support structure. The connectors 50 are movable between extended and retracted positions to secure and disengage with the support structure.

A variety of different panels 20 can be used with the Li-Fi network. The sides 21, 22 can each be planar and have a constant thickness measured between the sides 21, 22. The panels can also include the sides 21, 22 having different configurations such that the panel 20 has a varying thickness. The panel 20 includes perimeter edges 23 that extend between the sides 21, 22. The edges 23 may include a variety of shapes such as straight as illustrated in FIGS. 1 and 2, curved, and various combinations. The panel 20 may include a variety of different shapes including but not limited to polygonal, circular, and oval. The sides 21, 22 can include various sizes with various surfaces areas.

The panels 20 may be configured for use in a variety of different environments and for a variety of different purposes. These include but are not limited to solar panels 20, wall panels 20, glass panels 30 (e.g., windows, doors), ceiling panels 20, and internal building panels 20 constructed from a variety of materials such as sheetrock, plywood, and fiberglass. One aspect includes a solar panel 20 configured to obtain usable solar power through photovoltaics. The panel 20 includes the first side 21 with solar cells that absorb and convert sunlight into electricity. The panel 20 is also equipped with various electrical contacts and cabling, and various electronics such as an inverter to change the electric current from DC to AC.

The panel 20 is configured to be connected to and form a section of a Li-Fi network. The network provides for optical communication that uses light propagating in free space to wirelessly transmit data. In one design, the network operates under standard IEEE 802.15.7 for visible light communication.

Figure 3:
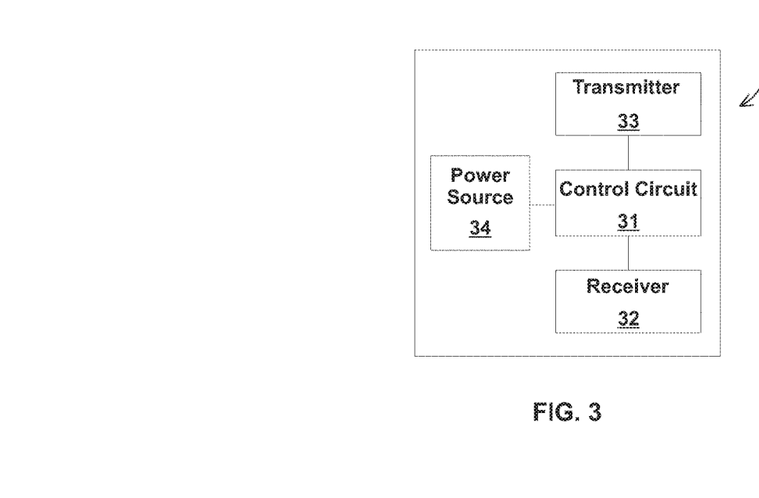
FIG. 3 is a schematic diagram of a node.

One or more nodes 30 are positioned and connected to the second side 22 of the panel 20. The nodes 30 may be directly connected to the second side 22, or may be connected to a component or other element on the second side 22. The nodes 30 provide for transmitting and receiving the light signals for bi-directional communication along the Li-Fi network. FIG. 3 schematically illustrates a node 30. The node 30 includes a control circuit 31 with one or more microprocessors, microcontrollers, Application Specific Integrated Circuits (ASICs), or the like, configured with appropriate software and/or firmware. A computer readable storage medium such as a memory circuit may be included with the control circuit 31 or a separate component from the control circuit 31. The medium stores data and computer readable program code that configures the control circuit 31 to operate the node 30. The medium is a non-transitory computer readable medium, and may include various memory devices such as random access memory, read-only memory, and flash memory.

The receiver 32 is configured to receive light signals along the Li-Fi network. In one design, receiver 32 is a photo diode. The receiver 32 may be configured to receive light from one or more light paths 40. Alternatively, the node 30 can include multiple receivers 32 that each receives light signals from one or more light paths 40.

The transmitter 33 is configured to transmit light signals along the Li-Fi network. In one design, the transmitter 33 is a light-emitting diode (LED). The transmitter 33 can transmit light along one or more light paths 40. The node 30 can include a single transmitter 33, or can include multiple transmitters that each transmits light signals along one or more light paths 40.

The node 30 may also include a power source 34 such as a rechargeable battery to provide power to one or more of the components. In a solar panel 20, the power source 34 may be recharged by the photovoltaic solar cells on the first or second sides 21, 22 of the panel 20.

The light paths 40 provide for the light signals to move to and from the nodes 30. The light paths 40 can extend between the transmitter 33 of a first node 30 to a receiver 32 of a second node 30. The light paths 40 include free space that allows for the transmission of the light signals between the nodes 30. This can occur when the nodes 30 are aligned within a line of sight, such as but not limited to between nodes 30 on a panel 20, between nodes 30 on adjacent panels 20, and between the node 30 and a support member 61 as will be explained below. The light paths 40 can also include optical fiber 80 configured to allow the passage of the light signals. The optical fiber can be made from glass or plastic. Aspects include the light paths 40 including just free space between the nodes, just optical fiber, and both free space and optical fiber.

Figure 4:
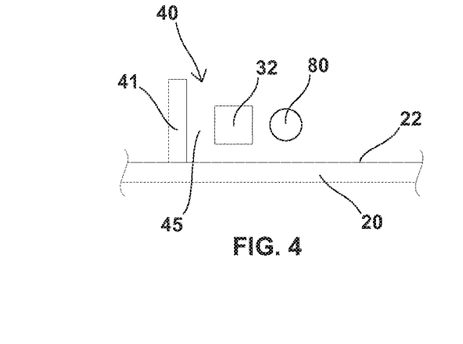
FIG. 4 is a schematic section view of a light path.
Figure 5:
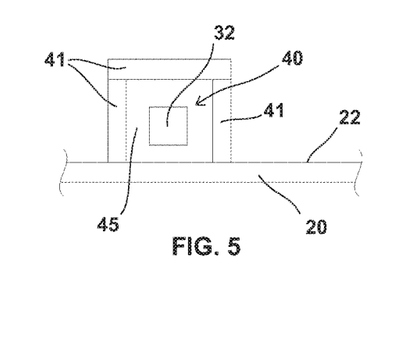
FIG. 5 is a schematic section view of a light path.

The light paths 40 can be bordered by one or more walls 41. FIG. 4 illustrates a light path 40 with free space 45 that allows for the signal transmission. The free space 45 is bordered by a wall 41 that extends from the panel 20. The second side 22 of the panel 20 also borders the free space 45. FIG. 5 illustrates a light path 40 with free space 45 that is enclosed within multiple walls 41 and the panel 20. In the various designs, the number, size, and shape of the one or more walls 41 may vary. Another design includes optical fiber extending through the free space 45 as illustrated in FIG. 4. Thus, light signals can be transmitted through the free space and/or the optical fiber.

The free space 45 extends along the light paths 40 to provide for the transmission of the light signals. The walls 41 may also be constructed such that the light signals may be reflected off the walls 41 when traveling to the destination. This can occur when the origination and destination points are not within a direct line of sight. Reflection can also occur when the points are within a direct line of sight.

Figure 6:
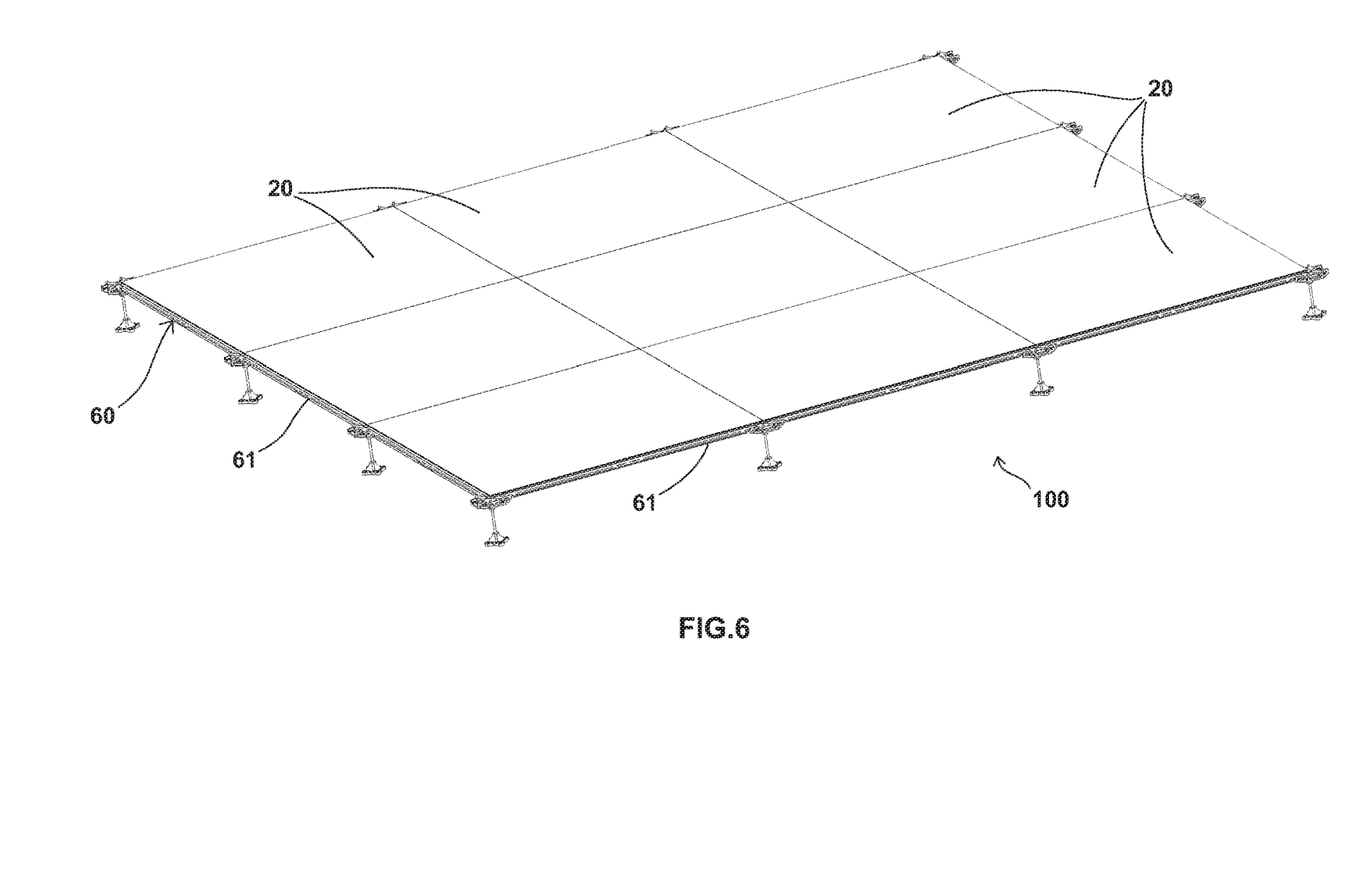
FIG. 6 is a perspective view of a panel array.

The panels 20 can be configured to provide for communication between adjacent panels 20 and/or support members 61 when the panels 20 are part of a larger array 100. FIG. 6 illustrates an array 100 that includes a series of panels 20 arranged together in a single unit. The panels 20 are mounted on a frame 60 that includes support members 61 that engage with the panels 20. As illustrated in FIG. 6, the panels 20 are configured with the components on the second side 22 not being visible. These components are protected by the panels 20, and also do not interfere with the functionality and/or aesthetic appearance of the panel 20. This type of array 100 can include but is not limited to a solar array, ceiling panel arrangement, and wall panel arrangement.

Figure 7A:
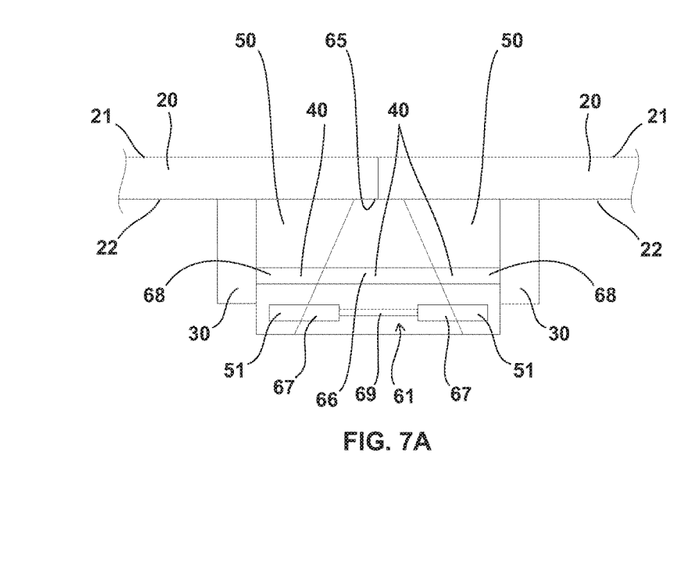
FIG. 7A is a side section view of a pair of panels engaged with a support member.

The panels 20 can be configured for communication with other panels 20. FIG. 7A illustrates a pair of panels 20 engaged with a support member 61. The support member 61 includes a truncated triangular sectional shape with a top edge 65 that contacts against the second side 22 of each of the panels 20. The support member 61 also includes a tapering shape that expands downward from the top edge 65. A slot 66 extends through the support member 61 and forms a portion of the light pathway 40 as will be explained below. The support member 61 can also include receptacles 67 to receive projections 51 on the connectors 50 on the panels 20. The projections 51 may also include electrical contacts (not illustrated in FIG. 7A) that provide for electrically connecting the panel 20 to the support member 61 and/or the adjacent panel 20.

The connectors 50 on the panels 20 are shaped and sized to match the support member 61. This can include complementary inclined surfaces that mate together when the panels 20 are positioned on the support member 61. The connectors 50 may also include the projections 51 that are movable between extended and retracted positions. The extended positioned extends into the corresponding receptacle 67 in the support member 61 to engage the support member 61. The retracted position retracts the extension 51 inward to remove the panel 20. Examples of connectors 50 are disclosed in U.S. patent Ser. No. 15/401,868 filed Jan. 9, 2017, U.S. application Ser. No. 15/665,751 filed Aug. 1, 2017, and U.S. application Ser. No. 15/665,767 filed Aug. 1, 2017. Each of these applications is hereby incorporated by reference in its entirety.

The panels 20 and support members 61 are further configured to provide for Li-Fi communication. A light path 40 is formed by one or more of the connectors 50 and support member 61. As illustrated in FIG. 7A, each connector 50 includes a slot 68 that aligns with the slot 66 in the support member 61. The aligned slots 68, 66 form the light path 40 that provides for the light signals to be transmitted between the panels 20. The nodes 30 are positioned in proximity to the connectors 50 such that the receivers 32 and transmitters 33 align with the light path 40.

FIG. 7A includes the light path 40 between the nodes 30 being formed in part by the connectors 50. That is, the connectors 50 include slots 68 through which the light signals travel. Other designs do not include the light path 40 extending through the connectors 50. Instead, the light path 40 is formed just by the support member 61. In another design, the support member 61 is configured such that it does not interfere with light communication between the nodes 30. The nodes 30 are positioned away from (e.g., above or below) the support member 61 and are within line of sight to provide for the light signal transmissions.

As further illustrated in FIG. 7A, the support member 61 includes a slot 69 that aligns with the receptacles 67 on the connectors 50. Thus, the receptacles 67 and slot 69 form a pathway to allow for direct electrical contacts 52 on the extensions 51 to directly contact together and form an electrical connection.

Figure 7B:
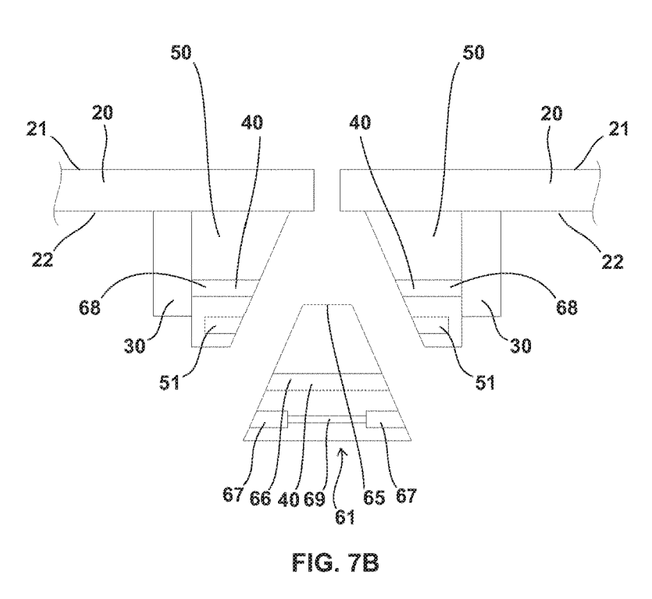
FIG. 7B is a side exploded view of the panels spaced from the support member.

FIG. 7B illustrates the panels 20 removed from the support member 61. As illustrated, the support member 61 and connectors 50 are shaped to complement each other to facilitate the attachment.

Figure 8:
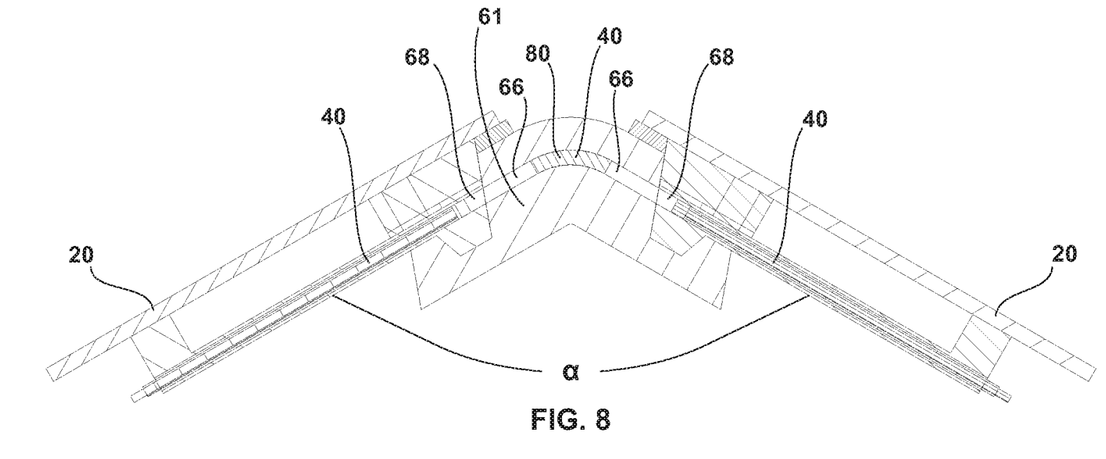
FIG. 8 is a side section view of a pair of panels engaged with a support member.

The design of FIGS. 7A and 7B includes the light path 40 that extends through the support member 61 being aligned along a common plane with the light paths 40 of the two panels 20. The light paths 40 can also be configured to accommodate different relative positioning between the panels 20. FIG. 8 includes the panels 20 being aligned along different planes. The support member 61 connects together the non-planar aligned panels 20. FIG. 8 includes the panels 20 aligned at an obtuse angle α. Other designs can include the panels 20 aligned at different alignments, including but not limited to acute angles and right angles.

To accommodate the offset angle between the panels 20, the slot 66 through the support member 61 is curved. In one design, the walls of the slot 66 are configured to reflect the light signals to allow for passage along the curved light path 40. In another design, an optical fiber 80 is positioned within the slot 66. The optical fiber 80 provides for transmitting the light signals along the light path 40 through the curvature caused by the non-planar alignment of the two panels 20. The optical fiber 80 can include flexible, transparent fiber fabricated from various materials, including but not limited to glass and plastic.

To facilitate communication between panels 20, the nodes 30 can be positioned in one or more of the corners of the panels 20. FIG. 2 illustrates nodes 30 positioned at two of the corners of the panel 20. Other designs include a node 30 positioned in each of the corners of a polygonal-shaped panel 20. In one specific design, a node 30 is positioned at each corner of a rectangular panel 20.

Figure 9:
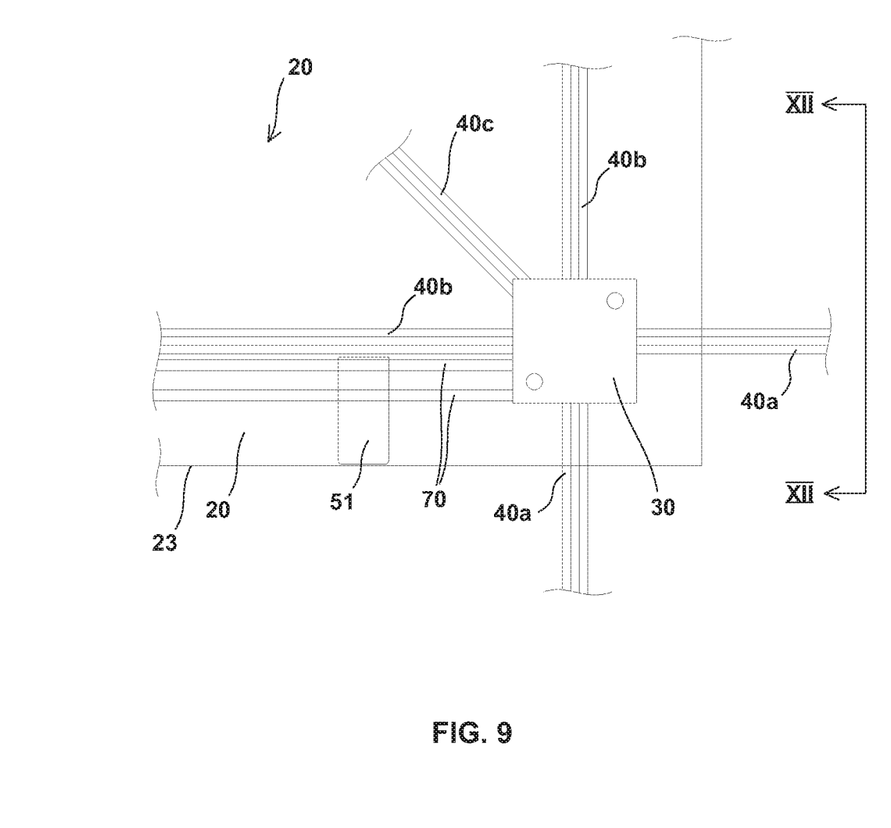
FIG. 9 is a schematic view of a second side of a panel that includes a node positioned in a corner.

FIG. 9 illustrates a node 30 positioned at the corner of the panel 20. This positioning facilitates light signal communication with other panels 20. One or more light paths 40a are positioned for signaling with adjacent panels 20 when connected to a frame 60 as part of a larger array 100. The panel 20 also includes one or more light paths 40*b* positioned for signaling with other nodes 30 on the panel 20. One or more light paths 40*c* may provide for light signals received and/or transmitted at the panel 20.

Figure 10:
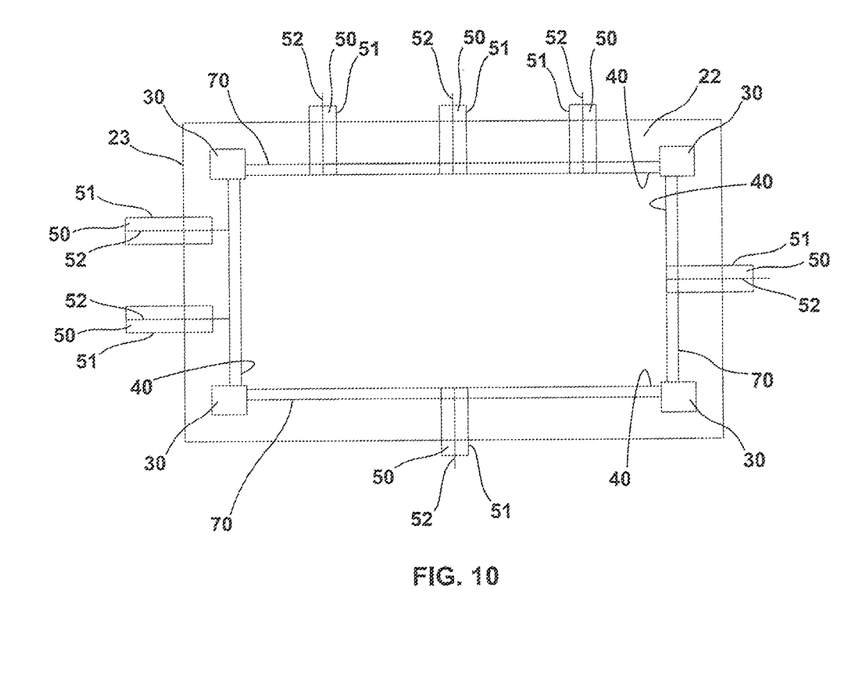
FIG. 10 is a schematic view of a second side of panel with nodes positioned in each of the corners.
Figure 11:
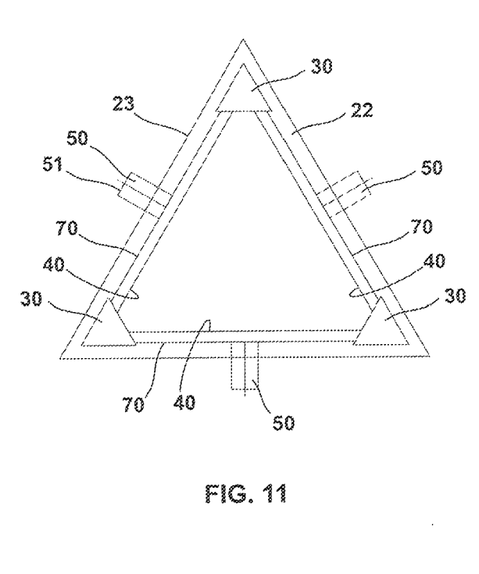
FIG. 11 is a schematic view of a second side of panel with nodes positioned in each of the corners.

One or more electrical buses 70 may extend along one or more of the sides of the panel 20. Each electrical bus 70 provides for electrical connection between the panel 20 and the support members 61 and/or one or more other panels 20. FIGS. 9, 10, and 11 illustrate panels 20 that include one or more electrical buses 70 that extend along the perimeter edges 23. The electrical buses 70 extend between the nodes 30 and along the light paths 40. In one design, the electrical buses 70 provide power to the nodes 30. The electrical buses 70 and light paths 40 can be parallel. One or more electrical contacts 52 extend from the electrical buses 70 to electrically connect with the support member 61 and/or adjacent panel 20. The electrical contacts 52 can be positioned in the extensions 51.

Figure 12:
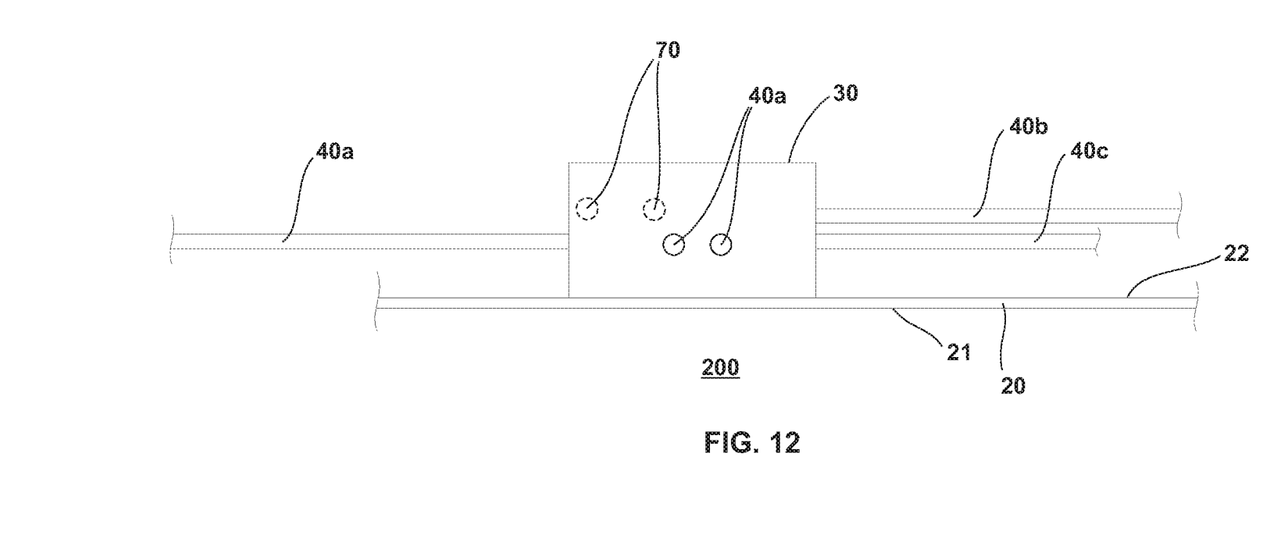
FIG. 12 is a section view along line XII-XII of FIG. 9.

FIG. 12 illustrates a side view of a portion of the second side 22 of the panel 20 of FIG. 9. The node 30 is connected to the second side 22. Other designs include the node 30 spaced away from the second side 22. As illustrated, the node 30 is positioned for light communications to and from other components on the panel 20. The node 30 also provides for light communication to and from other panels 20. The light paths 40 are spaced away from the second side 22 and include free space that is contained within an exterior wall.

Figure 13:
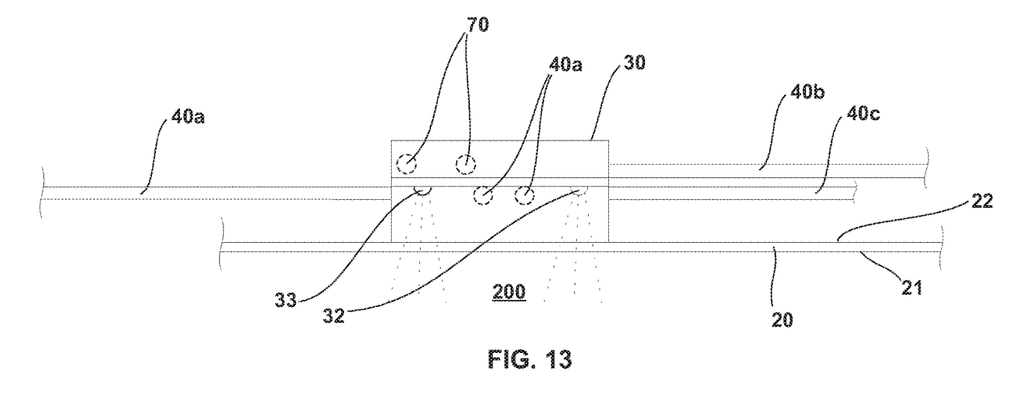
FIG. 13 is a side schematic view of a transparent panel with a node including one or more transmitters and receivers.

The panel 20 can be configured to communicate via the light signals into the environment 200 where the panel 20 is located. By way of example, this can include a panel 20 attached to a wall or ceiling of a room 200 that can communicate with one or more remote devices within the room. FIG. 13 includes the panel 20 constructed from a transparent material, such as glass or plastic. The node 30 includes the transmitter 33 and receiver 32 aligned to send and receive light signals through the panel 20 and into and from the environment 200. These transmitters 33 and receivers 32 may be the same or different from those that transmit and receive the light signals from the light paths 40. In this design, the entire panel 20 may be constructed from a transparent material, or just a limited section where the node 30 is located is constructed from a transparent material.

Figure 14:
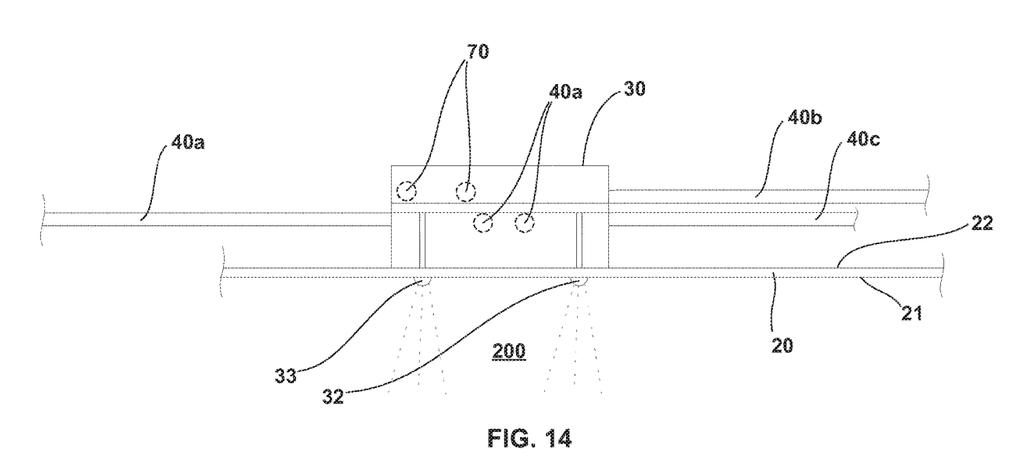
FIG. 14 is a side schematic view of an opaque panel with a node including one or more transmitters and receivers.

FIG. 14 includes a design with the panel 20 constructed from an opaque material. Examples of this include the panel being a wall panel or ceiling panel. Because of the opaque nature, the receiver 32 and transmitter 33 are positioned at the first side 21 of the panel 20 for communications into and from the environment 200.

The nodes 30 illustrated in FIGS. 13 and 14 may include one or more transmitters 33 configured to both transmit light signals along the one or more light paths 40 and into the environment 200. The node 30 can also include more than one transmitter with one or more transmitter configured to transmit light signals along the one or more light paths 40, and one or more separate transmitters 33 configured to transmit light signals into the environment 200. Likewise, the nodes 30 may include one or more receivers 32 configured to both receive light signals from the one or more light paths 40 and also from the environment 200. The nodes 30 can also include more than one receivers 32 with one or more receivers 32 configured to receive light signals from the one or more light paths 40, and one or more separate receivers 32 configured to receive light signals from the environment 200.

The panels 20 may be configured for use in a variety of different environments. One panel is configured for use in underwater applications. The node 30 may include a watertight housing that stores the one or more receivers 32 and transmitters 33. The light paths 40 may be contained for the free space to include air for the transmission of the light signals. The light paths 40 can also be configured to include water as the light signals of the Li-Fi network is able to travel through water.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A device for use in a Li-Fi Network, the device comprising:
    a panel comprising a first side and a second side, the panel also comprising a polygonal shape with perimeter sides and comprising corners;
    a first node connected to the second side of the panel at a first one of the corners, the first node and comprising a first transmitter configured to transmit light signals and a first receiver configured to receive the light signals;
    a second node spaced away from the first node and connected to the second side of the panel at a second one of the corners and comprising a second transmitter configured to transmit the light signals and a second receiver configured to receive the light signals;
    a third node spaced away from the first node and the second node and connected to the second side of the panel at a third one of the corners and comprising a third transmitter configured to transmit the light signals and a third receiver configured to receive the light signals;
    a first light path that extends along the second side of the panel at a first perimeter side and between the first and second nodes;
    a second light path that extends along the second side of the panel at a second perimeter side and between the second and third nodes;
    each of the first and second light paths configured to deliver signals within the Li-Fi Network and each of the first and second light paths comprising free space that is enclosed within at least one wall.

2. The device of claim 1, wherein the at least one wall of each of the first and second light paths is connected to the second side of the panel and each of the light paths is further enclosed by the second side of the panel.

3. The device of claim 1, further comprising an electrical bus connected to the second side of the panel, the electrical bus extending parallel with the first light path between the first and second nodes.

4. The device of claim 1, wherein the panel is transparent and the first and second transmitters are configured to transmit the light signals through the panel.

5. The device of claim 1, wherein the first node is positioned at a transparent section of the panel and the first transmitter is configured to transmit the light signals through the transparent section.

6. The device of claim 1, wherein the first node is positioned at a transparent section of the panel and the first receiver is configured to receive the light signals through the transparent section.

7. A device for use in a Li-Fi Network, the device comprising:

a panel comprising a first side and a second side, the panel having a polygonal shape with perimeter sides;

a plurality of nodes each positioned on the second side of the panel with one of the nodes positioned in each corner of the panel, each of the nodes configured to transmit and receive light signals;

a plurality of light paths each positioned on and extending along the second side of the panel between the plurality of nodes, each of the light paths extending along a different one of the perimeter sides of the panel, each of the light paths formed within at least one wall; and electrical buses that extend along the second side of the panel and along the perimeter sides of the panel between each of the plurality of nodes, and at least one electrical connector that extends from at least one of the electrical buses, the at least one electrical connector extends outward beyond one of the perimeter sides.

8. The device of claim 7, wherein the light paths are enclosed with the at least one wall.

9. The device of claim 7, wherein the light paths are further formed by the second side of the panel.

10. The device of claim 7, wherein the electrical buses are parallel to the light paths.

11. The device of claim 7, wherein the light paths comprise free space through which the light signals travel with the free space formed within the at least one wall.

* * * * *